(12) United States Patent
Pych (10) Patent No.: US 7,246,077 B1
(45) Date of Patent: Jul. 17, 2007

(54) SYSTEMS AND METHODS FOR GENERATING HIGHLY RESPONSIVE PROSPECT LISTS

(75) Inventor: Joseph T. Pych, South Royalton, VT (US)

(73) Assignee: NextMark, Inc., Hanover, NH (US)

( * ) Notice: Subject to any disclaimer, the term of this patent is extended or adjusted under 35 U.S.C. 154(b) by 722 days.

(21) Appl. No.: 09/697,233

(22) Filed: Oct. 26, 2000

Related U.S. Application Data (63) Continuation-in-part of application No. 09/661,010, filed on Sep. 13, 2000, and a continuation of application No. 09/662,364, filed on Sep. 13, 2000, and a continuation of application No. 09/662,429, filed on Sep. 13, 2000, and a continuation of application No. 09/662,362, filed on Sep. 13, 2000.

(60) Provisional application No. 60/161,496, filed on Oct. 26, 1999, provisional application No. 60/153,597, filed on Sep. 13, 1999, provisional application No. 60/153,592, filed on Sep. 13, 1999.

(51) Int. Cl.
  *G06Q 99/00* (2006.01)
(52) U.S. Cl. ............................................. 705/10; 705/1
(58) Field of Classification Search .................. 705/10, 705/1, 7
  See application file for complete search history.

(56) References Cited

U.S. PATENT DOCUMENTS 4,355,372 A 10/1982 Johnson et al. ............. 362/900

4,536,791 A 8/1985 Campbell et al. ............. 725/28

(Continued)

FOREIGN PATENT DOCUMENTS

WO  WO 0060502 A1 * 10/2000

OTHER PUBLICATIONS

Heinly, David, "NAHB Conferees Explore Strategies To Cope With a Market Revolution", Professional Builder and Remodeler, v55, n19, p13(2).*

(Continued)

*Primary Examiner*—Akiba K. Robinson-Boyce
(74) *Attorney, Agent, or Firm*—Foley Hoag LLP (57) ABSTRACT

The present invention provides systems and methods for generating a highly targeted list of prospective customers for a list purchaser at least partially based on successful prospect lists previously used by the list purchaser, based on prospect lists used by related list purchasers, such as list purchasers in the same or similar industry as the list purchaser, based on previous customers of the list purchaser or based on any combination of this data. The systems and methods of the present invention are particularly suited to network-based prospect list services that provide prospect lists from a database to prospect list purchasers, such as direct marketers, over a computer network, such as the Internet. A system for implementing a computerized prospect list service includes a server computer hosting a prospect list service accessible via client computers to a plurality of list purchasers and a database of prospect lists. The prospect list service includes a user interface having controls for a list purchaser to access information concerning prospect lists stored in the database. The prospect list service is preferably available via a computer network to assist a first list purchaser in generating and accessing a list of prospective customers based on previously successful lists of prospective customers generated for the first list purchaser.

38 Claims, 3 Drawing Sheets

U.S. PATENT DOCUMENTS

| | | | | |
|---|---|---|---|---|
| 4,603,232 | A | | 7/1986 | Kurland et al. ............... 179/2 |
| 5,303,149 | A | | 4/1994 | Janigian ..................... 707/6 |
| 5,341,496 | A | | 8/1994 | Middledorp et al. .......... 714/2 |
| 5,619,558 | A | | 4/1997 | Jheeta ...................... 379/90 |
| 5,636,346 | A | * | 6/1997 | Saxe ........................ 705/1 |
| 5,793,972 | A | | 8/1998 | Shane ..................... 709/219 |
| 5,806,057 | A | | 9/1998 | Gormley et al. .............. 707/1 |
| 5,819,291 | A | | 10/1998 | Haimowitz et al. ......... 707/201 |
| 5,845,285 | A | | 12/1998 | Klein ...................... 707/101 |
| 5,873,068 | A | | 2/1999 | Beaumont et al. ............ 705/14 |
| 5,930,764 | A | | 7/1999 | Melchione et al. ........... 705/10 |
| 5,966,695 | A | | 10/1999 | Melchione et al. ........... 705/10 |
| 5,983,222 | A | | 11/1999 | Morimoto et al. ............. 707/6 |
| 6,004,276 | A | * | 12/1999 | Wright et al. .............. 600/508 |
| 6,018,738 | A | | 1/2000 | Breese et al. .............. 707/100 |
| 6,026,398 | A | | 2/2000 | Brown et al. ................. 707/5 |
| 6,029,174 | A | | 2/2000 | Sprenger et al. ........... 707/103 |
| 6,092,053 | A | | 7/2000 | Boesch et al. ............... 705/26 |
| 6,098,048 | A | | 8/2000 | Dashefsky et al. .......... 705/10 |
| 6,167,435 | A | | 12/2000 | Druckenmiller et al. .... 709/206 |
| 6,182,050 | B1 | | 1/2001 | Ballard ...................... 705/14 |
| 6,185,555 | B1 | | 2/2001 | Sprenger et al. .............. 707/3 |
| 6,249,790 | B1 | | 6/2001 | Babcock, Jr. .............. 707/104 |
| 6,253,203 | B1 | | 6/2001 | O'Flaherty et al. ............ 707/9 |
| 6,256,664 | B1 | | 7/2001 | Donoho et al. ............. 709/204 |
| 6,275,824 | B1 | | 8/2001 | O'Flaherty et al. ............ 707/9 |
| 6,285,983 | B1 | | 9/2001 | Jenkins ...................... 705/10 |
| 6,298,348 | B1 | | 10/2001 | Eldering ................... 707/10 |
| 6,307,958 | B1 | * | 10/2001 | Deaton et al. .............. 382/139 |
| 6,321,224 | B1 | | 11/2001 | Beall et al. .................. 707/5 |
| 6,343,738 | B1 | | 2/2002 | Ogilvie .................... 235/381 |
| 6,446,261 | B1 | | 9/2002 | Rosser ..................... 725/34 |
| 6,868,389 | B1 | | 3/2005 | Wilkens et al. ............. 705/10 |
| 2002/0087573 | A1 | * | 7/2002 | Reuning et al. ............ 707/102 |
| 2006/0155567 | A1 | * | 7/2006 | Walker et al. ................ 705/1 |

OTHER PUBLICATIONS

Gralla, Preston, "Contacts & Facts Information Manager Stresses Simplicity, at Cost of Power", PC Week, v5,n33, p. 60 (1).*

Darsa, Deidra, "Demographic data help lenders work subprime market", Jan. 5, 1998, Real Estate Finance Today, v15,n1, p. 3, 7.*

Kalinoski, Glenn J, "Marketing firm says it goes beyond telemarketing to generate leads", Sep. 1998, Origination News, v7, n13, p. 96.*

Pasher, Victoria Sonshine, "PIA disapproves of USF&G alliance", Nov. 3, 1997, National Underwriter, v101n44, pp. 15-18.*

Anonymous, Information Industries: New Ideas on the Block, Mar. 14, 1992, Economist, v322n7750, pp. 83-84.*

Orr, Joel N., Join the Informeion Economy, Apr. 1992, CAE v11n4 pp. 84.*

Dyson, Esther, Information, bid and asked., Aug. 20, 1990, Forbes, v146, n4, p. 92(1).*

Beyond the Metaphor: Amix Builds adn Electronic Marketplace, Oct. 1990, Electronic Service Update, p. N/A.*

Aucken, et al., Valex User Guide, Jul. 22, 1997, 138 pages.

Resnick, Rosalind, "Netcreations releases Postmaster Direct Response 2.0 Real-Time List Ordering System for the Web", May 25, 1998, 2 pages.

Orr, Alicia, "What does it all mean to you", Target Marketing, Sep. 1999, vol. 22, No. 8, pp. 34-37.

Anonymous, "List Universe Launches Business Resource Network for Email List Owners and Ezine Publishers", PR Newswire, Jul. 8, 1999, No. 43001680, 3 pages.

Anon., "Calif. Chain Pushes Travel-Related Toys," Playthings, vol. 87, No. 2, p. 86, Feb. 1989.

Anon., "Picking Lists That Hit the Target," Bank Marketing, vol. 21, No. 4, p. 30, Apr. 1989.

Anon., "Can Uncle Sam be a Good Customer?", Direct, vol. 6, No. 4, p. 15, Apr. 1994.

Tighe, Foss, "New England Research Institute Uses FoxPro to Distribute Information," Data Based Advisor, vol. 13, No. 10, p. 84, Nov. 1995.

Anon., "Donnelly Virtually Shops Its List" (Abstract), Promo, vol. IX, No. 10, p. 71, Sep. 1996.

Anon., "NetCreations, Direct Media Team Up to Conduct 'Politically Correct' Direct Marketing on the Internet," Business Wire, p. 12111188, Dec. 11, 1996.

Anon., Acxiom® Announces Dramatic New Expansions to the Acxiom InfoBase™ Product Line, PR Newswire, p. 1001DAW023, Oct. 1, 1997.

Anon., "Restaurant Chain Uses Internet to Expand Database," Direct Marketing, vol. 61, No. 9, p. 17, Jan. 1999.

Levy, Doug, "Small Businesses Thrive on Net Retailers' Help," USA Today, Section Money, p. 3B, Apr. 12, 1999.

Hoffman, et al. "Building Consumer Trust Online", Communications of the ACM, vol. 42, Issue 4, pp. 80-85. ACM Press. Apr. 1999.

Wang, et al. "Consumer Privacy Concerns About Internet Marketing", Communications of the ACM, vol. 41, Issue 3, pp. 63-70. ACM Press. Mar. 1998.

Dern, D. "Start the Presses", Home Office Computing, 16(10): 116, (Oct. 1998).

Edwards & Edwards "Ten Best-bet Businesses for the 1990s", Home Office Computing, 10(7): 40, (Jul. 1992).

Gibbs, M. "Welcome to the Machine", Network World, p. 34, (Jan. 25, 1999).

Kennedy, S. "The Internet as a Communications Tool", Information Today, 14(2): 39, (Feb. 1997).

Levenson, H.A. "Affinity Card Income not UBTI", Tax Advisor, 29(1): 10, (Jan. 1998).

* cited by examiner

SYSTEMS AND METHODS FOR GENERATING HIGHLY RESPONSIVE PROSPECT LISTS

REFERENCE TO RELATED APPLICATIONS

This patent application claims priority to U.S. Provisional Patent Application No. 60/161,496 filed Oct. 26, 1999, and is a continuation-in-part of co-pending U.S. patent application Ser. No. 09/661,010, filed Sep. 13, 2000, U.S. patent application Ser. No. 09/662,364, filed Sep. 13, 2000, U.S. patent application Ser. No. 09/662,429, filed Sep. 13, 2000, and U.S. patent application Ser. No. 09/662,362, filed Sep. 13, 2000, each of which claims priority to U.S. Provisional Patent Application No. 60/153,597 filed Sep. 13, 1999, and U.S. Provisional Patent Application No. 60/153,592, filed Sep. 13, 1999. Each of the aforementioned patent applications is incorporated hereon by reference.

BACKGROUND OF THE INVENTION

This application generally relates to the generation of lists of prospective customers and, in particular, to the generation of highly responsive lists of prospective customers.

A successful marketing plan or marketing campaign is an important part of any business attempting to provide goods or services to consumers. To be successful, a marketing plan requires a list or lists of prospective customers that can be targeted to receive marketing material. Targeting marketing material to consumers relevant to the business, i.e. prospective customers of the business, is critical to ensuring high consumer response to the marketing material and conserving the marketing resources of the business.

Conventional methods of identifying a list or lists of prospective customers can produce poor results in terms of consumer response and can be too costly for some businesses. One common method involves the purchase of a prospect list through a list broker or directly from the source or manager of a prospect list. A prospect list typically contains a list of consumers (prospects) having at least one common attribute or characteristic. For example, the subscribers of a particular magazine may comprise a prospect list. Presently, there are over 28,000 available prospect lists. Because of the large number of available prospect lists, many list purchasers choose to work with a list broker to obtain a prospect list that includes likely consumers of the business. To be successful, the list broker must understand the business of the list purchaser, including, for example, the relevant industry, the competition, the present customers, the goods and services being sold, and how they have successfully been sold in the past. In addition, after analyzing the list purchaser, the list broker must understand the nature of the available prospect lists so as to make the proper recommendations to the list purchaser.

While manual list research may lead to finding effective and responsive prospect lists, it suffers from many drawbacks. Because of the large number of variables involved in identifying a useful prospect list, list brokers often rely on intuition to identify relevant prospect lists. As a result, two independent list brokers may identify two different prospect lists for the same list purchaser, and each list can produce dramatically different consumer responses. As the success or failure of a prospect list for each list purchaser is often not tracked, the response to a purchased prospect list is not considered during later use of the prospect list, leading to repeated and costly errors.

Yet another problem associated with manual list research is that the cost of the services is too much for many businesses. Thus, many businesses rely on prospect lists that are not specifically targeted to their potential customers. As a result, marketing material is frequently sent to consumers with a very low chance of interest. Consumers may consider such poorly targeted marketing material as "junk mail." As most consumers typically receive a deluge of marketing material by e-mail, telephone, or mail, poorly targeted marketing material can be annoying, wasteful, and can lead to relevant or highly targeted marketing material being disregarded along with the junk.

SUMMARY OF THE INVENTION

The present invention provides systems and methods for generating a highly targeted list of prospective customers for a list purchaser. The systems and methods of the present invention can generate targeted lists of prospective customers at least partially based on successful prospect lists previously used by the list purchaser, based on prospect lists used by related list purchasers, such as list purchasers in the same or similar industry as the list purchaser, based on previous customers of the list purchaser or based on any combination of this data. The systems and methods of the present invention are particularly suited to network-based prospect list services that provide prospect lists from a database to prospect list purchasers, such as direct marketers, over a computer network, such as the Internet.

In accordance with one aspect of the present invention, a method for generating a targeted list of prospective customers for a first list purchaser includes identifying, from a database of prospect lists, one or more successful lists of prospective customers generated for the list purchaser and identifying, from the database of prospect lists, at least one other list purchaser who has used at least a subset of the one or more successful lists identified for the first list purchaser. The method may further include identifying, from the database of prospect lists, successful lists of prospective customers generated for each of the other list purchasers. The first list purchaser may be provided access to a targeted list of prospective customers, including at least a subset of the successful lists of prospective customers identified for the first list purchaser and for the other list purchasers.

In accordance with a further aspect of the present invention, the list generating method may include ranking the prospect lists identified from the database based on predetermined factors to identify prospect lists most relevant to the first list purchaser. The predetermined factors can include, for example, how recently an order was placed for the prospect list, the total amount of money previously spent ordering prospective customers from the list, or the total number of customers ordered from the list.

In accordance with another aspect of the present invention, the list generating method includes removing duplicate prospective customers from the targeted list of prospective customers.

In accordance with a further aspect of the present invention, the database of prospective customers is a computer database available over a computer network via client computers to a plurality of list purchasers.

In accordance with another embodiment of the present invention, a method for generating a targeted list of prospective customers for a first list purchaser may include identifying, from a database containing information concerning prospect lists, a second list purchaser that is related to the first list purchaser based on predetermined criteria.

The list generating method may further include identifying, from the database, a successful prospect list identified for the second list purchaser. The first list purchaser may be provided access to a targeted list of prospective customers including one or more prospective customers from the prospect list identified for the second list purchaser.

In accordance with another aspect of the present invention, the list generating method may include identifying, from the database, a plurality of third-party list purchasers related to the first list purchaser based on predetermined criteria, and identifying, from the database, a plurality of successful prospect lists identified for one or more of the third-party list purchasers.

In accordance with a further aspect of the present invention, the predetermined criteria for identifying the second list purchaser concerns a similar or common characteristic of the first list purchaser and the second list purchaser. The characteristics may include, for example, the industry of the list purchasers, the Standard Industrial Classification (SIC) code of the list purchasers, or the geographic location of the list purchasers.

In accordance with another embodiment of the present invention, a method of for generating a targeted list of prospective customers for a first list purchaser may include identifying, from a database of prospect lists, a successful list of prospective customers for the first list purchaser. In addition, the list generating method includes identifying, from the database, a set of additional prospect lists that include prospective customers from the successful list of prospective customers for the first list purchaser. The first list purchaser may be provided access to a targeted list of prospective customers including one or more prospective customers from the set of additional prospect list.

In accordance with another aspect of the present invention, prospective customers stored in the database may be each assigned a unique known party ID. Identifying a set of additional prospect lists may include identifying prospective customers stored in the database having the known party ID assigned to prospective customers from the successful list of the first list purchaser. Alternatively, identifying a set of additional prospect lists may include identifying prospective customers stored in the database having attributes similar to attributes of the prospective customers from the successful list of the first list purchaser.

In accordance with a further aspect of the present invention, the list generating method includes soliciting feedback from the first list purchaser to evaluate the success of a prospect list provided to the first list purchaser. The feedback from the first list purchaser may be stored in the database. Identifying a successful list of prospective customers for the first list purchaser may be based on the feedback from the first list purchaser stored in the database.

The list generating methods of the present invention can be implemented as a set of processing instructions, stored in a computer readable storage medium, for directing a computer, such as a server hosting a prospect list service or a client computer, to carry out the steps of the methods.

A system for implementing a computerized prospect list service according to the present invention includes a server computer hosting a prospect list service accessible via client computers to a plurality of list purchasers and a database of prospect lists. The prospect list service includes a user interface comprising controls whereby a list purchaser can access information concerning prospect lists stored in the database. The prospect list service is preferably available via a computer network to assist a first list purchaser in generating and accessing a list of prospective customers based on previously successful lists of prospective customers generated for the first list purchaser.

In accordance with another aspect of the present invention, the prospect list service may be available via the computer network to assist a list purchaser in generating and accessing a list of prospective customers based on at least one previously successful list of prospective customers generated for a second list purchaser other than the first list purchaser. The prospect list service may identify the second list purchaser based on the second list purchaser's use of a previously successful list of the first list purchaser. Alternatively, the prospect list service may identify the second list purchaser based on predetermined criteria relating the second list purchaser to the first list purchaser. The predetermined criteria may include, for example, similar or common characteristics of the list purchasers such as the industry of the first list purchaser.

In accordance with a further aspect of the present invention, the prospect list service may be available via the computer network to assist a list purchaser in generating and accessing a list of prospective customers based on at least one list of prospective customer generated for a second list purchaser that includes one or more prospective customers included in a previously successful list of prospective customers generated for the first list purchaser.

DETAILED DESCRIPTION OF PREFERRED EMBODIMENTS

To provide an overall understanding of the invention, certain illustrative embodiments will now be described, including systems and methods for generating a highly targeted list of prospective customers for a list purchaser. The systems and methods of the present invention may be implemented as part of an online prospect list service available via a computer network, such as the Internet, to assist a list purchaser in selecting and purchasing a list of prospects from a list manager. As used herein, the term "prospect list" generally refers to a list of prospects having one or more common characteristics or attributes. A prospect can be, for example, an individual, a group of individuals, a household, a businesses, or other entity or organization. The term "list manager" as used herein generally refers to any person, business, or other entity responsible for distribution of a prospect list, including the list owner or list source. The term "list purchaser" refers to any person, business, or other entity interested in acquiring access to a list of potential customers. A list purchaser can be, for example, a marketer interested obtaining a list of potential customers to direct marketing or advertising to or can be a list broker working on behalf of one or more marketers.

The online prospect list service, as well as the systems and methods for implementing the service, are also described in commonly-owned, pending U.S. patent application Ser. No. 09/661,010, filed Sep. 13, 2000, entitled Method and System for Acquiring Prospect Lists over a Computer Network, U.S. patent application Ser. No. 09/662,364, filed Sep. 13, 2000, entitled Method and System for Storing Prospect Lists in a Database, U.S. patent application Ser. No. 09/662,429, filed Sep. 13, 2000, entitled Method and System for Distributing Prospect Lists over a Computer Network, and U.S. patent application Ser. No. 09/662,362, filed Sep. 13, 2000, entitled Method and Systems for Enabling Privacy Control in a Prospect List Database.

The embodiments described herein will focus on a prospect list service that is accessible over a computer network via client computers, such as the prospect list services described in the aforementioned commonly-owned patent applications. It would, however, be easily understood by one of skill in the art that the systems and methods for generating a highly targeted list of prospective customers of the present invention can be implemented in other fashions without departing from the scope of the present invention.

Prospect lists used in implementing the systems and methods of the present invention are preferably stored in one or more databases, such as the computer databases of prospect lists described in the aforementioned commonly-owned patent applications. One skilled in the art will appreciate that prospect list databases may be realized using any computer database system including object oriented or relational database systems. Preferably, a relational database system, such as, for example Oracle, MySQL, Informix, DBS, or SQL Server may be used to realize the prospect list databases of the present invention. For this reason, the following description and associated figures describe the prospect list databases using relational database terminology. However, one skilled in the art will appreciate that other database systems may be used to implement the present invention.

Figure 1:
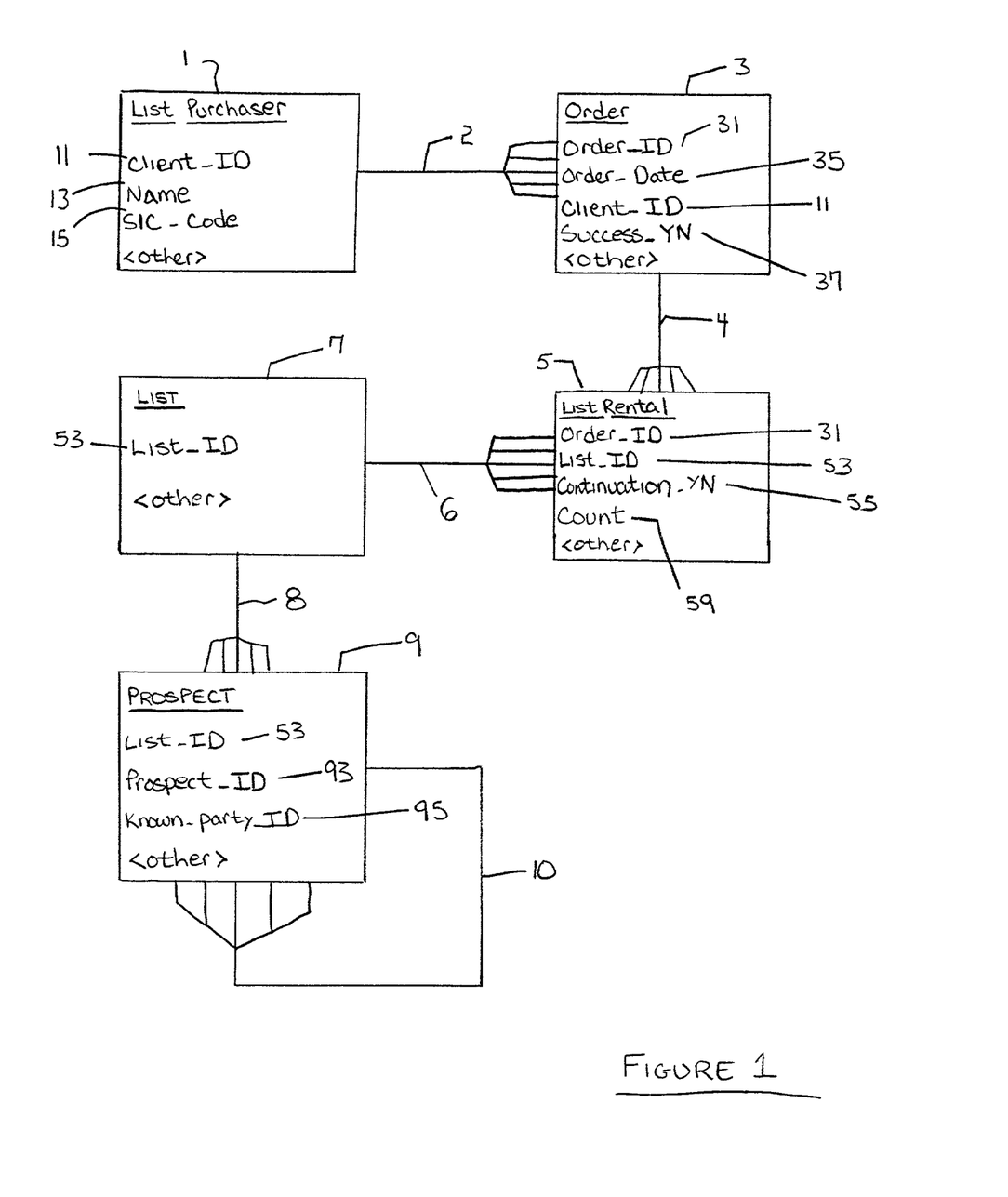
FIG. 1 is a schematic illustrating a simplified prospect list database according to the teachings of the present invention.

FIG. 1 illustrates a simplified example of a prospect list database that can be used to implement the systems and methods for generating targeted lists of prospective customers for a list purchaser of the present invention. The database is made up of a collection of data structures and relationships between those data structures. The data structure can be a table from a relational database, an object from an object oriented database or any other type of data structure which can be used to store data in a database. As the prospect list database is preferably implemented by a relational database system, the following description of the component database structures will use the terminology of relational databases. One skilled in the art will appreciate, however, that the type of database structure is dependent upon the database system employed, and that alternative structures may be used without departing from the scope of the present invention.

The prospect list database includes a list purchaser data table 1 that provides data about the list purchasers that may have previously purchased lists from the database or otherwise transacted or communicated with the prospect list service. The list purchaser data may include information such as, for example, the name 13 of the list purchaser, a list purchaser or client ID 11, which may be assigned to the list purchaser by the prospect list database, and characteristics of the list purchaser. The list purchaser characteristics may include data characterizing the list purchasers, for example, the industry of the list purchaser, the type of goods or services sold by the list purchaser, and/or the geographic location of the list purchaser. The industry of each list purchaser may be represented using the Standard Industrial Classification Code ("SIC Code") 15. One skilled in the art will appreciate that additional data concerning list purchasers may be included in the list purchaser data table 1 without departing from the scope of the present invention.

The exemplary prospect list database illustrated in FIG. 1 can also include a list order data table 3 providing data about orders, by list purchasers, for prospect lists stored in the database. The list order data table 3 has a relationship to the list purchaser data table 1 represented by the c/o relationship 2. The c/o relationship 2 indicates that each list purchaser may have placed any number of orders for prospect lists, from zero upwards. Each list order in the list order data table 3, thus, may be connected to one list purchaser in the list purchaser data table 1, although one list purchaser in the list purchaser data table 1 may be connected to one or more list orders stored in the list order data table 3. One skilled in the art will appreciate that each of the data tables of the prospect list database, including the list purchaser data table and the list order data table, can be a single data table containing data about a plurality of list purchasers or list orders, respectively, or, alternatively, can be a plurality of data tables, each including data about one list purchaser or list order, respectively. For the purpose of simplicity, one list order data table 3 is shown in FIG. 1.

The list order data table 3 may include information related to orders for prospect lists provided by list purchasers. Such list order data may include, for example, a unique order ID 31 assigned by the list purchaser or the prospect list database, the list purchaser or client ID 11 of the list purchaser placing the order, and an order date 35. The list order data table 3 may also include success data 37 indicating the success of ordered prospect list(s) for the list purchaser. In the list order table 3, success data 37 can stored as the Boolean values of true or false (yes/no), although additional information may be stored. For example, a ranking system may be employed in which the list purchaser or the prospect list service ranks the success of the list order on a sliding scale. The success of a list order may be determined by soliciting feedback from the list purchaser about the list order. For example, measuring the response to marketing directed to prospective customers included on the ordered prospect lists may provide the list purchaser with an indication of the successfulness of the prospect list order. The list purchaser feedback can be stored as success data 37 in the prospect list database. Alternatively, as discussed below, the success data 37 can be provided by the prospect list service.

The prospect list database illustrated in FIG. 1 may include a list rental data table 5 providing data concerning the prospect lists associated with an order from a list purchaser for prospect lists. The list rental data table 5 is related to the list order data table 3 by the o/r relationship 4. Generally, a list order included in a list order data table 3 may be related to one or more prospect lists included in a list rental data table 5. Generally, each list rental data table 5 may be related to a single list order, as a prospect list order may request multiple prospect lists, and, preferably, each time a prospect list is ordered the prospect list is related specifically to the order through the list rental data table 5. Thus, a prospect list may be included in multiple list rental data tables 5 so as to identify relationships between the prospect list and the corresponding list orders.

The list rental data structure 5 may include information related to the purchase of an ordered prospect list. List purchase information may include the list order ID 31 to associate the purchased prospect list with the corresponding list order. The list rental data table 5 can also include the list ID 53 of the prospect list being purchased and continuation data 55 specifying whether or not the prospect list is a continuation of a previously ordered prospect list. One manner of determining if a prospect list is successful for a list purchaser is to allow the list purchaser to order and purchase a subset of the prospects included on the prospect list and, then, send marketing material to that limited subset. If the list purchaser is satisfied with the response from the subset of prospects, the list purchaser may then order additional prospects from that list. The subsequent order of all or additional prospects is referred to as a continuation of the initial order. One skilled in the art will appreciate that there may be additional continuations after the initial continuation. The continuation data 55 can be useful, as a subsequent order of a prospect list, e.g., a continuation list, may indicate that the prospect list was successful for the list purchaser. The number or count 57 of prospects purchased from the prospect list and the cost 59 of purchasing the prospects can also be included in the list rental data table 5.

The prospect list database can also include one or more list data tables 7 for storing information concerning a prospect list purchased by the list purchaser. The list data table 7 may be associated with the list rental data table 5 by the r/l relationship 6. Generally each list rental data table 5 will be associated with one list data table 7. Each list data table 7, however, may be associated with any number of list rental tables 5, as each prospect list stored in the database may be purchased multiple times, especially if it is particularly successful.

The list data table 7 may include information concerning one or more prospect lists including, for example, the a unique list ID 53 assigned to each prospect list in the database.

The prospect list database may include a prospect data table 9 for storing information related to the prospects of a prospect list. The prospect data table 9 is related to the list data table 7 by the l/p relation 8. Each prospect list stored in the database may include one or more prospects, thus, each prospect list included in a list data table 7 may be associated with a plurality of prospect data stored in one or more prospect data tables 9. Each prospect included in a prospect data table 9 may be associated with only one prospect list, as prospects may be repeated to provide for the same prospect occurring on multiple lists.

The prospect data table 9 may include prospect data relating to one or more prospects included in a prospect list stored in the database. The prospect data may include a prospect ID 93 to uniquely identify the prospect, as well as a known party or universal prospect ID 95. The known party ID 95 may be used to uniquely identify a prospect that is included on more than one prospect list stored in the database. For example, if John Smith appears on two or more prospect lists, his known party ID 95 may be the same for each prospect list, while his prospect ID 93 may be unique to each individual appearance on a prospect list. Thus, the known party ID 95 indicates a repetition of the same prospect, while the prospect ID 93 identifies a specific copy of the prospect data. The prospect data table 9 may also store a List ID 53 to identify the prospect list that a prospect is associated with, and may also generally store other attributes associated with the prospect such as, but not limited to, age, income, height, other demographic information, and/or other information useful in determining the likelihood of a prospect desiring to receiving marketing material related to certain types of goods or services.

The p/p connection 10 illustrates the relationship between the prospect data table 9 and other prospect data tables for the same prospect, but associated with different prospect lists. The p/p relationship 10 indicates that each prospect record can be associated with zero or more other prospect records having the same known party ID 95, but with having different prospect IDs 93.

Figure 2:
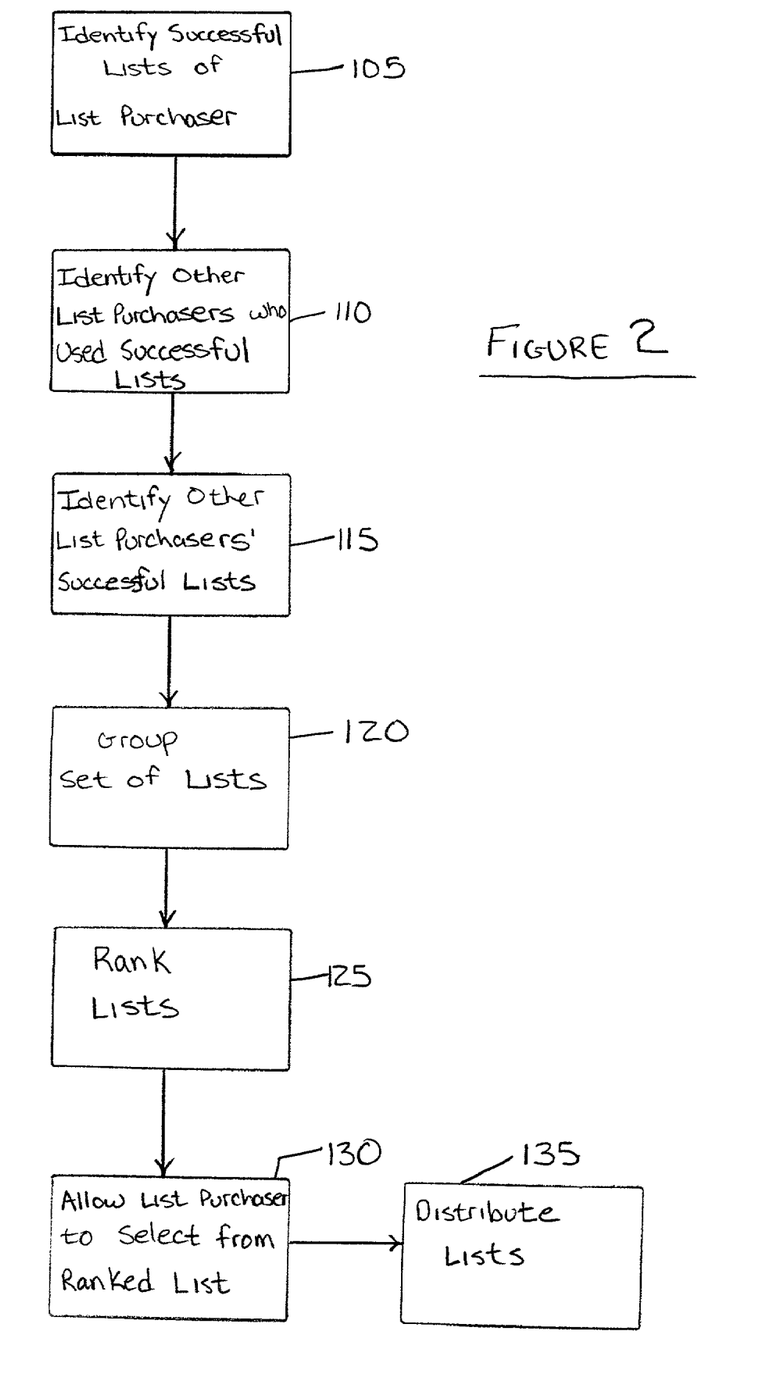
FIG. 2 is a flowchart illustrating a method of generating a list of prospective customers for a list purchaser based on a previously successful prospect list of the list purchaser.

Highly targeted list of prospective customers can be generated using the exemplary prospect list database illustrated in FIG. 1 and described above. FIG. 2 illustrates one embodiment of a method for generating a highly targeted list of prospective customers for a list purchaser. In particular, FIG. 2 illustrates the process of retrieving a list of prospective customers from the database by using prospect lists that were previously successful for the list purchaser and prospect lists that were previously successful for another list purchaser. This process can be useful in enabling list purchasers to leverage the success of their own and others' past marketing efforts.

Initially, the prospect list system, using the database system that stores and manages the prospect list database, identifies prospect lists that were previously successful for the list purchaser, step 105. Successful prospect list can be identified by first identifying which prospect list orders where successful for the list purchaser. A successful order can be identified based on the success data 37 in the order data tables 3 associated with the list purchaser. For each order that was successful, the database system can then identify prospect lists associated with the order, based on the list ID stored in the list rental data table 5, as well as, any continuation prospect lists, via the continuation data 55 in the list rental data table 5.

The prospect list system can then identify other list purchasers who successfully used the same previously successful prospect lists as the initial list purchaser, step 110. The other list purchasers can be identified via the list IDs of the previously successful prospect lists of the first list purchaser in the list rental data table 5 and by identifying the list purchasers, possibly via the client ID 11, from the related order data tables 3. Alternative methods can also be employed to achieve similar results. For example, all successful lists may be identified for each list purchasers and, each successful prospect list can be compared the previously successful prospect lists for the initial list purchaser. The client ID of other list purchasers using the same successful lists can then be identified.

In step 115, the prospect list system identifies any additional successful prospect lists that other list purchasers, identified in step 110, have used successfully. To identify the additional successful prospect lists, all prospect list orders placed that were considered successful for each of the identified other list purchasers are specified via the success data 37 in the order data table 3 or by the continuation data 55 in the list rental table 5. The successful lists for the initial list purchaser and the successful lists for the other list purchasers can be grouped to create a set of similar lists, step 120. The system preferably eliminates the identified prospect lists that the list purchaser previously used, whether or not the previously used prospect lists were successful for the list purchaser. In addition, any duplicate identified prospect lists are also preferably removed.

In step 125, the prospect list system, using the database management system, ranks the identified prospect lists based on predetermined factors to identify the prospect lists most relevant to the list purchaser. The predetermined factors or criteria may include, for example, how recently an order was placed for the prospect list, the total amount previously spent of the prospect list, or the total number of customers ordered from the list, as well as any additional criteria indicative of the successfulness of a prospect list. The criteria can also be combined to form composite criteria or multi-vectored criteria for ranking the prospect list. Methods of ranking are well known in the art and one skilled in the art will appreciate that other methods of ranking may be adapted to the rank the prospect lists. The ranking rules may be chosen by the system administrator, some other outside party, or by the list purchaser. In an embodiment in which the ranking scheme is selected by the list purchaser, the list purchaser may be able to select from a plurality of pre-established ranking schemes. The pre-established ranking schemes can rank prospect lists by one or more criteria.

The result of the ranking step is a ranked set of prospect lists that can be presented to the list purchaser. The list purchaser can select one or all of the ranked prospect lists using the user interface of the prospect list system, step 130. The list purchaser can then be provided access to the selected prospect lists, step 135. As described in detail in the above referenced commonly-owned patent applications, the prospect lists can be distributed directly to the list purchaser, through a third-party to the list purchaser, or to a third party to contact the prospects on behalf of the list purchaser.

In a further embodiment of the invention, the list generation process described above in connection with FIG. 2 can be employed using unsuccessful lists of the list purchaser. For example, a list purchaser can identify other list purchasers that were unsuccessful with the same prospect lists as the list purchaser and, then, identify prospect lists that the other list purchasers were successful with. In a still further embodiment, successful and unsuccessful prospect lists can be used simultaneously to identify other list purchasers.

In accordance with a further embodiment of the invention, a method of generating a targeted list of prospective customers for a list purchaser can employ successful prospect lists of the list purchaser's peers or competitors. The strategy associated with this method recognizes that if a prospect list works for a peer or competitor of the list purchaser, the prospect list is also likely to work for the list purchaser. This list generation process may be useful, in particular, to a list purchaser without a direct marketing history or with a generally unsuccessful marketing history to generate a highly responsive, targeted list.

Figure 3:
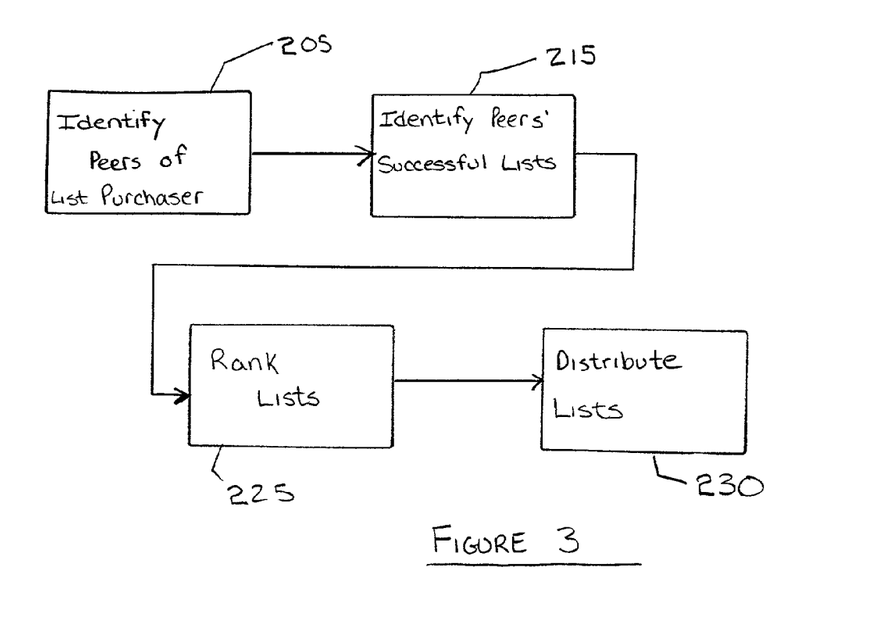
FIG. 3 is a flowchart illustrating a method of generating a list of prospective customers for a list purchaser based on a previously successful prospect list of another list purchaser.

FIG. 3 illustrates a list generating process employing successful prospect lists of the peers or competitors of the list purchaser. Initially, the prospect list system identifies the list purchaser's peer group or competitors, step 205. The peers or competitors of the list purchaser can be provided by a system operator, by the list purchaser, and/or through the prospect list data stored in the prospect list database. As discussed above, the prospect list database can store characteristics about each list purchaser in a list purchaser data table 1. The list purchaser data table can include information about the industry of the list purchaser, such as the SIC code. Using the database management system, list purchasers having similar characteristics, such as the same SIC code, can be identified to create a peer group. For example, list purchasers having the same SIC Code may be part of the same peer group.

The prospect list system can then identify the set of prospect lists that the peer group have used successfully, step 215. Successful prospect lists can be identified in accordance with the methods described above in connection with FIG. 2. The successful prospect lists can then be ranked to identify prospect lists most relevant to the list purchaser, step 225. The list purchaser can select one or all of the identified prospect lists and the selected prospect lists can be distributed to the list purchaser, step 230.

In accordance with another embodiment of the present invention, a method of generating a targeted list of prospective customers can identify other prospect lists including prospects from the successful prospect lists of the list purchaser. This list generation method allows the list purchaser to utilize its present customers to identify additional customers having the same or similar characteristics. As the average customer may have a significant number of characteristics or attributes, it is often difficult to identify prospects having similar attributes. The list generating methods of the present invention, simplify the process of identify similar prospects by utilizing the prospect list database.

Figure 4:
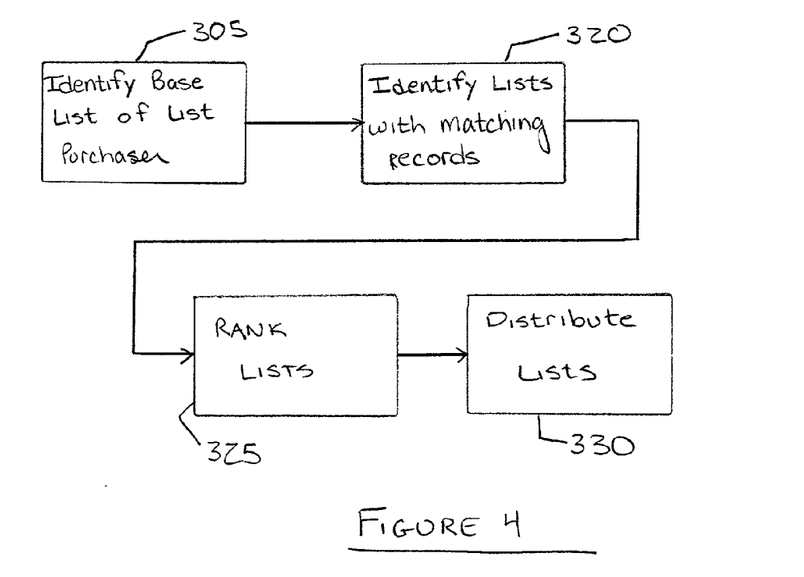
FIG. 4 is a flowchart illustrating a method of generating a list of prospective customers for a list purchaser based on a prospect list including previous customers of the list purchaser.

In accordance with one embodiment, the list purchaser may submit its customer list to the prospect list database to provide a basis to identify prospect lists in the prospect list database including the current customers of the list purchaser. The customer list of the list purchaser can be matched against all other prospect lists in the database to identify prospect lists including the current customers. Prospect lists including a high number of current customers are likely include prospects similar to the current customers. This process can also be employed using the previously successful prospect lists of the list purchaser. FIG. 4 illustrates in more detail a list generating process identifying prospect lists including prospects having similar attributes as the list purchaser's current customers.

Initially, the list purchaser can select the list to be employed in the list generating process, step 305. As discussed above, the list purchaser can select, for example, a current customer list, a previously successful list, or any other list to serve as the basis for identifying additional prospect lists. Alternatively, the database management system can be employed to identify successful list of the list purchaser or the list purchaser's peers to serve as the basis of comparison.

Upon selecting the base list, the prospect list database can be searched to identify prospect lists that include customers or prospects from the base list, step 320. The known party ID can be utilized to identify the prospects or customers common to the base list and other lists in the database. As discussed above, any two prospect records in the database having the same known party ID are for the same prospect. Alternatively, the prospect list database can be searched to identify prospects having the same or similar attributes as the prospects on the base list.

The identified prospect lists can be ranked to identify prospect lists most relevant to the list purchaser, in step 325. Ranking can be achieved using the ranking methods described above or, alternatively, by ranking the identified prospect lists based on the number or percentage of prospects common list to the base list. For example, for each identified prospect list, the number of common prospects can be divided by the total number of prospects on the list to provide a ranking metric. Alternatively, for each list, the number of common prospects can be divided by the total number of prospects on the base list to provide a ranking metric. One skilled in the art will appreciate that the ranking metrics can be combined to rank the identified prospect lists. Methods for combining the ranking metrics can include, but are not limited to, employing a weighted product (e.g. 2 times the result of the first calculation times 3 times the result of the second calculation). The end result of each of the calculations is a number by which the prospect lists can be ranked. The ranking rules may be configurable by the list purchaser.

The list purchaser can select one or all of the identified prospect lists and the selected prospect lists can be distributed to the list purchaser, step 330.

One skilled in the art will appreciate that all or parts of two or more of the above described list generating methods, including the list generating methods illustrated in FIGS. 2-4, can combined to generate a targeted list of prospective customers for a list purchaser.

While the invention has been disclosed in connection with the preferred embodiments shown and described in detail, various modifications and improvements thereon will become readily apparent to those skilled in the art. Accordingly, the spirit and scope of the present invention is to be defined only by the following claims.

The invention claimed is:

1. A method for generating a targeted list of prospective customers for a first list purchaser, the method comprising:
   providing in a computer-readable medium a database of prospect lists of prospective purchasers, the database associating with each of a plurality of the prospect lists (i) at least one list purchaser who used the prospect list and (ii) for each list purchaser who used that prospect list, data that indicate whether feedback from the list purchaser reported a successful use of that prospect list; and
   using a computer system to:
      identify, in the database of prospect lists, at least one said prospect list that the database associates with the first list purchaser and with data that indicate that the first list purchaser reported a successful use of that prospect list, thereby forming a first list group of which each member is a prospect list thus identified;
      identify, in the database of prospect lists, at least one other list purchaser indicated by the data to have reported a successful use of a list in the first list group;
      for each such other list purchaser, identify, in the database of prospect lists, at least one prospect list of which a successful use is indicated by the data to have been reported by that other list purchaser; thereby forming a second list group of which each member is a prospect list thus identified and
      provide the first list purchaser access to a targeted list of prospective customers drawn from among said second list group consisting of at least one prospect list thus identified.

2. The method of claim 1, further comprising using the computer system to:
   rank the prospect lists identified in the database and associated with the at least one other list purchaser based on predetermined factors.

3. The method of claim 1, further comprising using a computer system to:
   remove duplicate prospective customers from the targeted list of prospective customers.

4. The method of claim 1, wherein the database of prospective customers is a computer database available over a computer network via client computers to a plurality of list purchasers.

5. The method of claim 1, wherein using the computer system to provide access to the first list purchaser includes using the computer system to:
   distribute the targeted list of prospective customers to the first list purchaser.

6. The method of claim 1, wherein providing access to the first list purchaser includes
   distributing the targeted list of prospective customers to a third party associated with the first list purchaser.

7. The method of claim 6, wherein the third party contacts prospective customers on behalf of the first list purchaser.

8. The method of claim 6, wherein the third party stores the targeted list of prospective customers on a storage medium and delivers the storage medium to the first list purchaser.

9. A computer-readable storage medium encoded with processing instructions for directing a computer to:
   communicate with a database of prospect lists of prospective purchasers, the database associating with each of a plurality of the prospect lists (i) at least one list purchaser who used the prospect list and (ii) for each list purchaser who used that prospect list, data that indicate whether feedback from the list purchaser reported a successful use of that prospect list; and
   identify, in the database of prospect lists, at least one said prospect list that the database associates with the first list purchaser and with data that indicate that the first list purchaser reported a successful use of that prospect list, thereby forming a first list group of which each member is a prospect list thus identified;
   identify, in the database of prospect lists, at least one other list purchaser indicated by the data to have reported a successful use of a list in the first list group;
   for each such other list purchaser, identify, in the database of prospect lists, at least one prospect list of which a successful use is indicated by the data to have been reported by that other list purchaser; thereby forming a second list group of which each member is a prospect list thus identified and
   provide the first list purchaser access to a targeted list of prospective customers drawn from among said second list group consisting of at least one prospect list thus identified.

10. The computer-readable storage medium of claim 9, further comprising processing instructions for directing the computer to
    rank the prospect lists identified in the database and associated with the at least one other list purchaser based on predetermined factors.

11. The computer-readable storage medium of claim 9, further comprising processing instructions for directing the computer to
    remove duplicate prospective customers from the targeted list of prospective customers.

12. The computer-readable storage medium of claim 9, wherein the database is a computer database of prospective customers available over a computer network via client computers to a plurality of list purchasers.

13. The computer-readable storage medium of claim 12, wherein the database of prospective customers is coupled to the computer over a computer network.

14. A system for implementing a computerized prospect list of prospective purchasers, the system comprising:
    a database of prospect lists of prospective purchasers, the database associating with each of a plurality of the prospect lists (i) at least one list purchaser who used the prospect list and (ii) for each list purchaser who used that prospect list, data that indicate whether feedback from the list purchaser reported a successful use of that prospect list; and
    a server computer configured to provide the prospect list to a plurality of list purchasers via client computers by:

identifying, in the database of prospect lists, at least one said prospect list that the database associates with the first list purchaser and with data that indicate that the first list purchaser reported a successful use of that prospect list, thereby forming a first list group of which each member is a prospect list thus identified;

identifying, in the database of prospect lists, at least one other list purchaser indicated by the data to have reported a successful use of a list in the first list group;

for each such other list purchaser, identifying, in the database of prospect lists, at least one prospect list of which a successful use is indicated by the data to have been reported by that other list purchaser; thereby forming a second list group of which each member is a prospect list thus identified and providing the first list purchaser access to a targeted list of prospective customers drawn from among said second list group consisting of at least one prospect list thus identified.

15. The system of claim 14, wherein the server computer identifies at least one said other list purchaser based on additional predetermined criteria relating that other list purchaser to the first list purchaser.

16. The system of claim 15, wherein the predetermined criteria concerns a business of the first list purchaser and the at least one other list purchaser.

17. A method for generating a targeted list of prospective customers for a first list purchaser, the method comprising:
using a computer system to:
identify, in a computer database of prospect lists, a successful list of prospective customers that the computer database associates with the first list purchaser and with data that indicate that the first list purchaser reported a successful use of that prospect list;
identify, in the computer database, at least one other prospect list that includes at least one of the prospective customers included in the successful list of prospective customers for the first list purchaser; and
provide to the first list purchaser access to a targeted list of prospective customers, the targeted list including at least one of the prospective customers from the at least one other prospect list.

18. The method of claim 17, wherein each of the prospective customers stored in the computer database is assigned a unique known party ID and wherein using the computer system to identify the at least one other prospect list includes using the computer system to:
identify, in the database, prospective customers that have the same known party ID as the known party ID assigned to at least one of the prospective customers from the successful list of prospective customers for the first list purchaser.

19. The method of claim 17, wherein using the computer system to identify the at least one other prospect list includes using the computer system to:
identify, in the database, prospective customers having at least one attribute similar to at least one attribute of at least one of the prospective customers from the successful list of prospective customers for the first list purchaser.

20. The method of claim 17, further comprising using the computer system to:
rank the at least one other prospect list identified in the computer database based on predetermined factors.

21. The method of claim 17, further comprising using the computer system to:
remove duplicate prospective customers from the targeted list of prospective customers.

22. The method of claim 17, wherein using the computer system to provide access to the first list purchaser includes using the computer system to:
distribute the targeted list of prospective customers to the first list purchaser.

23. The method of claim 17, wherein using the computer system to provide access to the first list purchaser includes using the computer system to:
distribute the targeted list of prospective customers to a third party associated with the first list purchaser.

24. The method of claim 23, wherein the third party contacts prospective customers on behalf of the first list purchaser.

25. The method of claim 23, wherein the third party stores the targeted list of prospective customers on a storage medium and delivers the storage medium to the first list purchaser.

26. The method of claim 17, further comprising using the computer system to:
solicit feedback from the first list purchaser to evaluate success of the targeted list provided to the first list purchaser.

27. The method of claim 26, further comprising using the computer system to:
store the feedback from the first list purchaser in the computer database.

28. A computer-readable storage medium encoded with processing instructions for directing a computer to:
identify, in a computer database of prospect lists, a successful list of prospective customers that the computer database associates with the first list purchaser and with data that indicate that the first list purchaser reported a successful use of that prospect list;
identify, in the computer database, at least one other prospect list that includes at least one of the prospective customers included in the successful list of prospective customers for the first list purchaser; and
provide to the first list purchaser access to a targeted list of prospective customers, the targeted list including at least one of the prospective customers from the at least one other prospect list.

29. The computer-readable storage medium of claim 28, wherein each of the prospective customers stored in the computer database is assigned a unique known party ID and further comprising processing instructions for directing the computer to
identify, in the database, prospective customers that have the same known party ID as the known party ID assigned to at least one of the prospective customers from the successful list of prospective customers for the first list purchaser.

30. The computer-readable storage medium of claim 28, wherein the processing instructions for directing the computer to identify the at least one other prospect list includes processing instructions for directing the computer to
identify, in the database, prospective customers having at least one attribute similar to at least one attribute of at least one of the prospective customers from the successful list of prospective customers for the first list purchaser.

31. The computer-readable storage medium of claim 28, further comprising processing instructions for directing the computer to
rank the at least one other prospect list identified in the computer database based on predetermined factors.

32. The computer-readable storage medium of claim 28, further comprising processing instructions for directing the computer to
removing duplicate prospective customers from the targeted list of prospective customers.

33. The computer-readable storage medium of claim 28, further comprising processing instructions for directing the computer to
solicit feedback from the first list purchaser to evaluate success of the targeted list provided to the first list purchaser.

34. The computer-readable storage medium of claim 33, further comprising processing instructions for directing the computer to
store the feedback from the first list purchaser in the computer database.

35. The computer-readable storage medium of claim 34, wherein identifying a successful list of prospective customers for the first list purchaser is based on the feedback from the first list purchaser stored in the computer database.

36. A computer system for generating a targeted list of prospective customers for a first list purchaser, the computer system comprising:
means for storing a database of prospective lists of prospective purchasers, the database associating with each of a plurality of the prospect lists (i) at least one list purchaser who used the prospect list and (ii) for each list purchaser who used that prospect list, data that indicate whether feedback from the list purchaser reported a successful use of that prospect list;
a network interface for connective the computer system to a computer network, the computer system being accessible over the computer network via client computers to a plurality of list purchasers;
means for providing a user interface comprising controls whereby a list purchaser can access information concerning prospect lists stored in the database; and
means for generating the targeted list for the first list purchaser, the means being configured to:
identify, in the database of prospect lists, at least one said prospect list that the database associates with the first list purchaser and with data that indicate that the first list purchaser reported a successful use of that prospect list, thereby forming a first list group of which each member is a prospect list thus identified;
identify, in the database of prospect lists, at least one other list purchaser indicated by the data to have reported a successful use of a list in the first list group;
for each such other list purchaser, identify, in the database of prospect lists, at least one prospect list of which a successful use is indicated by the data to have been reported by that other list purchaser; thereby forming a second list group of which each member is a prospect list thus identified and
provide the first list purchaser access to a targeted list of prospective customers drawn from among said second list group consisting of at least one prospect list thus identified.

37. The computer system of claim 36, wherein the means for generating the targeted list is configured to identify at least one of the at least one other list purchaser based on additional predetermined criteria relating the at least one of the at least one other list purchaser to the first list purchaser.

38. The computer system of claim 36, wherein the predetermined criteria concerns a business of the first list purchaser and the at least one of the at least one other list purchaser.

* * * * *